United States Patent
Garner et al.

[11] Patent Number: 5,163,252
[45] Date of Patent: Nov. 17, 1992

[54] ADJUSTABLE SHIELD FOR A DYNAMIC TOOL

[75] Inventors: David I. Garner; Larry J. Pyle, both of Berkeley, Calif.

[73] Assignee: Northwestern Equipment & Supply Co., Berkeley, Calif.

[21] Appl. No.: 608,728

[22] Filed: Nov. 5, 1990

[51] Int. Cl.⁵ ............................................. B24B 55/04
[52] U.S. Cl. ........................................ 51/268; 51/269; 51/271; 83/478; 74/609
[58] Field of Search ............. 144/251 R; 51/268, 269, 51/271; 74/609; 408/241 G; 409/134; 83/478

[56] References Cited

U.S. PATENT DOCUMENTS

| | | | |
|---|---|---|---|
| 3,298,409 | 1/1967 | Elson | 83/478 |
| 3,969,856 | 7/1976 | Zerrer | 51/268 |
| 4,059,930 | 11/1977 | Alessio | 51/268 |
| 4,891,915 | 1/1990 | Yasuda et al. | 51/268 |
| 4,924,635 | 5/1990 | Rudolf et al. | 51/268 |

FOREIGN PATENT DOCUMENTS 0050210  4/1982  European Pat. Off. ............ 408/241

Primary Examiner—Frank T. Yost
Assistant Examiner—Allan M. Schrock
Attorney, Agent, or Firm—Theodore J. Bielen, Jr.

[57] ABSTRACT

A shield for a dynamic cutting tool having a drive mechanism. A plurality of depressions are formed in a member surrounding the outer surface of the cutting tool mechanism or directly into the outer surface of the cutting tool mechanism. A flange member having a body portion at least partially surrounds the surface bearing the depressions and is movable relative to the same. A locking protuberance for selectively engaging any of the plurality depressions found on the accessible surface of the member is also provided and connects to the flange member.

7 Claims, 2 Drawing Sheets

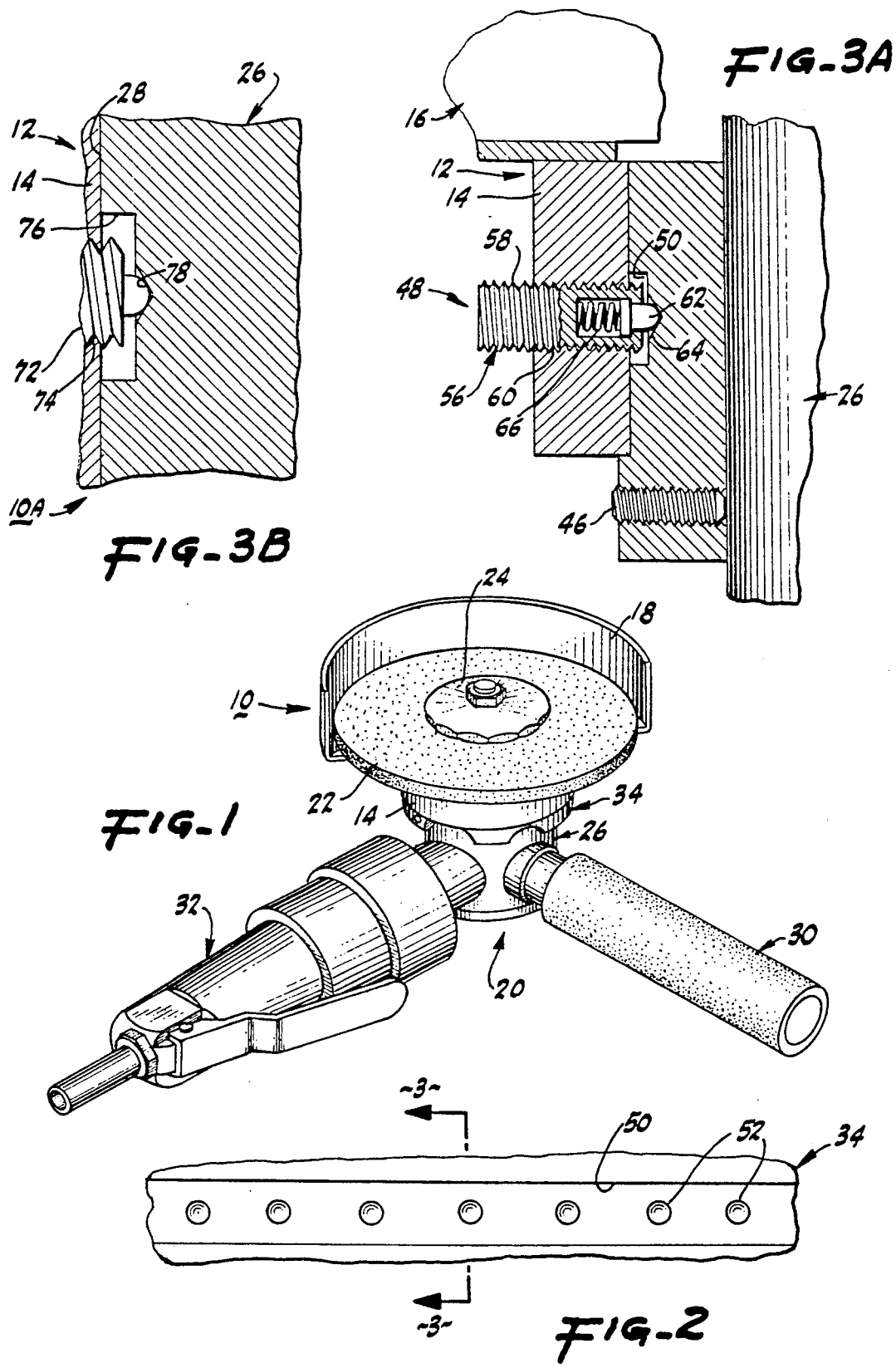

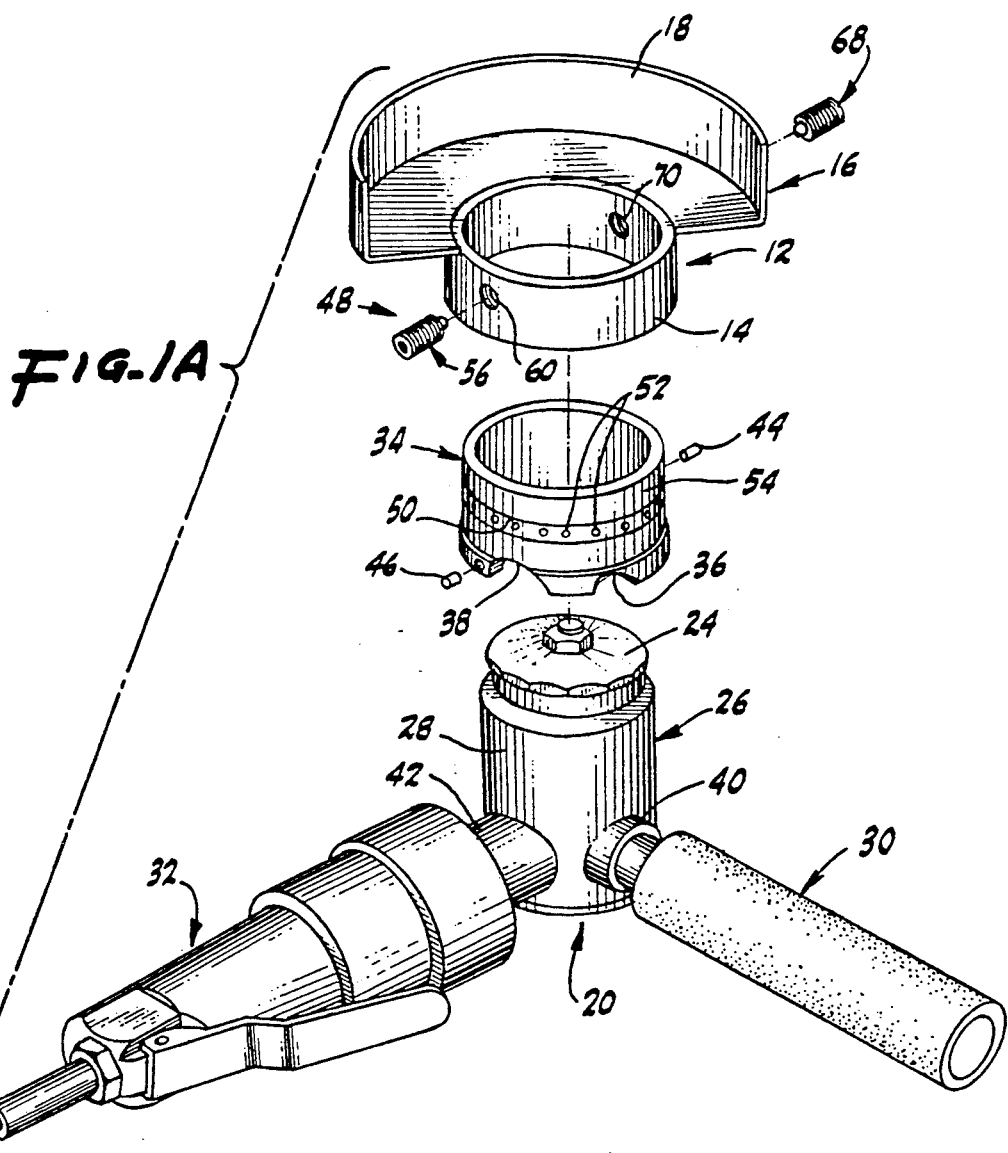

ADJUSTABLE SHIELD FOR A DYNAMIC TOOL

BACKGROUND OF THE INVENTION

The present invention relates to a novel shield mechanism for a dynamic cutting tool which is easily adjustable.

Dynamic tools are often used for cutting material such as metal, plastic and the like. For example, hand held grinders and drills fall into this category. Dynamic cutting tools may be either pneumatically or electrical driven. In certain cases dynamic cutting tools possess a self contained motor.

In the past, guards have been devised to prevent materials, separated by the cutting tool, injuring the user of the tool, especially in the facial area. Past designs for cutting tool shields are considered to be unwieldy or extremely difficult to adjust when changing the cutting angle of the dynamic cutting tool. Unfortunately, such prior shields are either not used or removed from the cutting tool, resulting in increased risk of injury to the user.

A shield for a dynamic cutting tool which addresses and solves the problems found in the prior art would be a great advance in the field of industrial tools.

SUMMARY OF THE INVENTION

In accordance with the present invention a novel and useful shield for a dynamic cutting tool is herein provided.

The shield includes a flange member having a body portion with an outer surface which at least partially surrounds an accessible surface of the dynamic cutting tool driving mechanism adjacent the tool itself. The flange member also is formed with an extension portion, projecting outwardly from the body portion, which is less extensive than the entire outer surface of the driving mechanism for the dynamic cutting tool. In this way the tool is permitted to perform its task on the working material.

Locking means is also included in the present invention for selectively engaging a plurality of depressions which may be placed in the outer surface of the driving mechanism for the dynamic cutting tool. Generally, the plurality of the depressions extend around such outer surface at a certain depth. One or more protuberances are connected to the body portion of the flange member and extend through the body portion of the flange member to engage any of the plurality of depressions. Spring means may also be used to bias such protuberances toward engagement of any of the plurality of the depressions. Thus, the flange member is movable or rotatable around the outer surface of the driving mechanism for the dynamic cutting tool and stops at certain positions where the protuberance engages a particular depression. The plurality of depressions may also be found in a groove which brackets the plurality of depressions and prevents the flange member from slipping along a particular direction, such as along the axis of the dynamic cutting tool. The flange member may also include an angled portion which projects outwardly from the extension portion of the flange member to further reduce any injury to the user by material freed by the dynamic cutting tool.

Although the plurality of depressions may be formed in the outer surface of the driving mechanism for the dynamic cutting tool, a distinct member may be employed having an accessible surface in this regard. The plurality of depressions may, thus, be formed in such accessible surface of the distinct member. The member may then be fixed to the outer surface of the driving mechanism of the dynamic cutting tool. Needless to say, such distinct member may also include a groove to bracket or partially encompass the plurality of depressions which may have a greater depth than the groove. In such aspect of the invention, an existing tool may be converted for use with the flange member which has been hereinabove elucidated.

It may be apparent that a novel and useful shield for a dynamic cutting tool has been described.

It is therefore an object of the present invention to provide a shield for a dynamic cutting tool which is easily adjustable for use with the dynamic cutting tool employed in various working positions.

It is another object of the present invention to provide a shield for a dynamic cutting tool which may either be originally constructed in the body of the driving mechanism for the dynamic cutting tool or retrofitted to an existing dynamic cutting tool driving mechanism.

It is a further object of the present invention to provide a shield for a dynamic cutting tool which prevents injuries to the user of the same.

A further object of the present invention is to provide a shield for dynamic cutting tool which is simple and relatively inexpensive to manufacture and maintain.

The invention possesses other objects and advantages especially as concerns particular characteristics and features thereof which will become apparent as the specification continues.

BRIEF DESCRIPTION OF THE DRAWINGS

FIG. 1 is a top right perspective view of a typical dynamic cutting tool mechanism fitted with shield of the present invention.

FIG. 1A is an exploded view of the dynamic cutting tool mechanism and shield depicted in FIG. 1.

FIG. 2 is a broken side view of the groove and plurality of depressions found on a portion of the shield of the present invention depicted in FIG. 1A.

FIG. 3A is a sectional view taken along line 3—3 of FIG. 2.

FIG. 3B is an alternate embodiment of the present invention where the plurality of depressions are formed directly in the outer surface of the driving mechanism of the dynamic cutting tool.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the following detailed description of the preferred embodiments which should be taken in conjunction with the prior described drawings.

The invention has a whole is shown in the drawings, by reference characters 10 and 10A. Shield mechanism 10, FIG. 1, includes as one of its elements a flange member 12 having a body portion 14 and an extension portion 16. In addition, angled portion 18 connected to extension portion 16 is also depicted in the drawings, FIGS. 1 and 2, to further protect the user in the use of the dynamic cutting tool mechanism 20. In this regard, mechanism 20 is depicted as a automatic grinding tool Model No. 1166 manufactured by Dresser Industries of Houston, Tex. Mechanism 20 includes a dynamic cutting tool 22, in the form of a grinding disc. Disc 22 is held to collect 24 which extends from driving mechanism housing 26 having an outer surface 28. Gripping handle 30 and air regulator valve 32 extend along coplanar axes from body portion 26.

With reference to FIG. 1A it may be observed that shield 10 also includes a member 34 which fits over outer surface 28 of body portion 26. Member 34 is generally cylindrical in configuration to conform to the outer surface 28 of body portion 26 and includes recesses 36 and 38 which fit over neck portions 40 and 42 of handle 30 and air regulator valve 32, respectively. Set screws 44 and 46 hold member 34 to the driving mechanism housing 26.

The present invention also includes as one of its elements locking means 48. Locking means 48 is constructed in the present invention by forming a groove 50 and a plurality of depressions 52 in the outer surface 54 of member 34, FIGS. 1A and 2. A protuberance 56 is utilized in locking means 48 to engage any of the plurality of the depressions 52 in the outer surface 54 of member 34. Protuberance 56 includes a threaded portion 58, FIG. 3A, which threadingly engages an opening 60 through body portion 14 of flange member 12. Tip 62 of protuberance 56 is biased into groove 50 in any of the plurality of depressions 52, such as depression 64, FIG. 3A, by a spring member 66. Protuberance 68 is constructed identically and functions in the same manner as protuberance 56 in conjunction threaded openings 70 through body portion 14 of flange member 12. Of course, the distance separation between protuberances 56 and 68 would coincide with the position of plurality of depressions 52 to assure simultaneous engagement of protuberances 56 and 68 with plurality of depressions 52.

With reference to FIG. 3B, it may be observed that a protuberance 72, similarly constructed to protuberances 56 and 68, passes through a threaded opening 74 of body portion 14 of flange member 12. However, a groove 76 is formed in outer surface 28 of driving mechanism body 26, rather than member 34, and includes a plurality of depressions, shown by exemplar depression 78, in the same manner as the illustrated structure for groove 50 and plurality of depressions 52, heretofore described. Thus, in the embodiment 10A depicted in FIG. 3B, member 34 is not required. Embodiment 10A is especially applicable to the original construction of the dynamic cutting tool mechanism of the present invention.

In operation, the user places member 34 on the outer surface 28 of driving mechanism body 26 and fastens the same thereto with set screws 46. Recesses 36 and 38 would lie over neck portions 40 and 42 of handle 30 and air regulator valve 32. Flange member 12 would then fit over the outer surface 54 of member 34 (shown as an endless surface) such that protuberances 56 and 68 may be threaded through openings 60 and 70. At this juncture, protuberances 56 and 68 engage any of the plurality of openings 52 found within groove 50. Thus, flange member 12 may be rotated around member 34 and "clicked" into place at a number of positions. Simple tightening of protuberances 56 and 68 would hold flange member 12 in a particular place. Loosening protuberances 56 and 68 would permit further rotation of body portion 14 of flange member about member 34 such that protuberances 56 and 68 may engage other depressions in the plurality of depressions found in groove 50. In essence, extension portion 16 and angled portion 18 of flange member 12 are repositioned relative to disc 22 of tool mechanism 20. The user of tool mechanism 20 is able to, in this case, grind material at any position along the perimeter of disc relative to handle 30 and air regulator valve 32 with the proper positioning of shield mechanism 10 to protect the user from injury.

While in the foregoing embodiments of the invention have been set forth in considerable details for the purpose of making a complete disclosure of the invention it may be apparent to those of skill in the art that numerous changes may be made in such details without departing from the spirit and principles of the invention.

What is claimed is:

1. A shield for a dynamic cutting tool having a driving mechanism including an outer surface adjacent the dynamic cutting tool, comprising:
   a. a member having an surface;
   b. a plurality of depressions in said surface of said member;
   c. means for fixing said member to the outer surface of the driving mechanism of the dynamic cutting tool, such that said surface of said member is accessible relative to said outer surface of the driving mechanism fixed to said member;
   d. a flange member, said flange member including body portion having an outer surface, said body portion at least partially surrounding and being relatively movable to said surface of said member and a portion projecting outwardly from said body portion along less than the entire outer surface of the driving mechanism; and
   e. locking means for selectively engaging any of said plurality of depressions of said surface of said member, said locking means being connected to said flange member body portion, said locking means further including a protuberance extending through said portion of said flange member, spring means for biasing said protuberance into any of said plurality of depressions in said outer surface of said member while permitting movement of said flange member, and means for selectively fixing said protuberance into any of said plurality depressions to prevent movement of said flange member.

2. A shield for a dynamic cutting tool having a driving mechanism including an outer surface adjacent the dynamic cutting tool, comprising:
   a. a plurality of depressions in the outer surface of the dynamic cutting tool driving mechanism;
   b. a flange member, said flange member including a body portion at least partially surrounding and being relatively movable relative to the outer surface of the cutting tool; and
   c. locking means for selectively engaging any of said plurality of depressions in the outer surface of the cutting tool said locking means being connected to said flange member body portion, said locking means further including a protuberance extending through said portion of said flange member, spring means for biasing said protuberance into any of said plurality of depressions in said outer surface of said member while permitting movement of said flange member, and means for selectively fixing said protuberance into any of said plurality depressions to prevent movement of said flange member.

3. The shield of claim 1 in which additionally comprises a groove along the accessible surface of said member, said plurality of depressions being located in said groove.

4. The shield of claim 1 in which said flange member further includes an angled portion projecting outwardly from said extension portion.

5. The shield of claim 1 in which said member surface is an endless surface.

6. The shield of claim 5 in which said plurality of depressions each possess a greater depth than said groove.

7. The shield of claim 4 in which said extension portion at least partially encompasses said tool.

* * * * *